United States Patent
Kiely

(10) Patent No.: US 7,549,549 B1
(45) Date of Patent: Jun. 23, 2009

(54) UNIVERSAL LOW VOLTAGE BOX BRACKET

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 436 days.

(21) Appl. No.: 11/262,873

(22) Filed: Oct. 31, 2005

(51) Int. Cl.
*H02G 3/08* (2006.01)

(52) U.S. Cl. ........................................ 220/3.7; 220/3.2

(58) Field of Classification Search ................. 220/3.3, 220/3.7, 3.9, 4.02; 174/520, 542
See application file for complete search history.

(56) References Cited

U.S. PATENT DOCUMENTS

| | | | | |
|---|---|---|---|---|
| 1,477,806 | A | * | 12/1923 | Bonell .................... 220/3.2 |
| 2,439,091 | A | * | 4/1948 | Keating .................. 248/27.1 |
| 3,701,451 | A | * | 10/1972 | Schindler et al. ......... 220/277 |
| 4,943,022 | A | * | 7/1990 | Rinderer ................. 248/205.1 |
| 4,964,525 | A | * | 10/1990 | Coffey et al. ............ 220/3.9 |
| 5,005,792 | A | * | 4/1991 | Rinderer ................. 248/205.1 |
| 5,025,944 | A | * | 6/1991 | Rodick ................... 220/3.9 |
| 5,191,171 | A | * | 3/1993 | Bordwell ................. 174/666 |
| 5,289,934 | A | * | 3/1994 | Smith et al. ............. 220/3.7 |
| 5,354,953 | A | * | 10/1994 | Nattel et al. ............ 174/54 |
| 5,408,045 | A | * | 4/1995 | Jorgensen et al. ......... 174/58 |
| 5,488,011 | A | | 1/1996 | Figura et al. |
| 5,509,560 | A | * | 4/1996 | Nash ..................... 220/3.9 |
| 5,595,362 | A | * | 1/1997 | Rinderer et al. .......... 248/27.1 |
| 5,596,174 | A | * | 1/1997 | Sapienza ................. 174/57 |
| 5,646,371 | A | * | 7/1997 | Fabian ................... 174/58 |
| 5,833,110 | A | * | 11/1998 | Chandler et al. .......... 220/3.9 |
| D427,889 | S | | 7/2000 | Gretz |
| 6,093,890 | A | * | 7/2000 | Gretz .................... 174/58 |
| 6,152,578 | A | * | 11/2000 | Hoffman et al. ........... 362/285 |
| 6,229,087 | B1 | * | 5/2001 | Archer ................... 174/50 |
| 6,307,154 | B1 | * | 10/2001 | Gretz .................... 174/50 |
| 6,346,674 | B1 | | 2/2002 | Gretz |
| D457,140 | S | | 5/2002 | Roesch et al. |
| D459,312 | S | | 6/2002 | Roesch et al. |
| D462,664 | S | | 9/2002 | Roesch et al. |

(Continued)

OTHER PUBLICATIONS

Ace Hardware. "Installing Drywall". Wayback Machine, http://www.acehardware.com/sm-installing-drywall--bg-1299080.html, Jul. 20, 2005. p. 2, Table: Estimating Nails, Joint Compounds and Tape.*

*Primary Examiner*—Anthony D Stashick
*Assistant Examiner*—Robert J Hicks
(74) *Attorney, Agent, or Firm*—Fattibene and Fattibene; Paul A. Fattibene; Arthur T. Fattibene

(57) ABSTRACT

A universal electric box bracket adapted for use in walls of various constructions having opposed side walls interconnected by opposed end walls to define a fully open ended rectangular box. The opposed side walls include outwardly extending flanges by which the box bracket may be secured to a stud or furring strip in variable orientated positions. The opposed end walls have connected thereto a pair of spaced apart rails for slidably receiving a support plate for supporting an electrical conduit. The support plate is constructed so that it can be detachably secured when supported between the rails. The respective end walls are also provided with spaced apart fastener supports for holding in place a fastener which can be driven into a supporting stud or framing of a wall structure as an alternate manner of attachment.

11 Claims, 4 Drawing Sheets

U.S. PATENT DOCUMENTS

| | | |
|---|---|---|
| 6,452,098 B1 | 9/2002 | Gretz |
| 6,452,813 B1 | 9/2002 | Gretz |
| 6,573,446 B1 * | 6/2003 | Umstead et al. ............... 174/50 |
| 6,624,355 B1 | 9/2003 | Gretz |
| 6,710,245 B2 | 3/2004 | Roesch et al. |
| 6,812,405 B1 | 11/2004 | Hull et al. |
| D510,323 S * | 10/2005 | Hawken ................... D13/152 |
| D513,495 S * | 1/2006 | Hull et al. ................... D13/152 |
| 7,019,211 B2 * | 3/2006 | Rose ........................... 174/58 |
| D523,818 S * | 6/2006 | Roesch et al. .............. D13/152 |
| 7,075,006 B2 * | 7/2006 | Nojima et al. ................ 174/58 |
| 7,353,961 B2 * | 4/2008 | Hull et al. ................... 220/3.2 |
| 2003/0024725 A1 * | 2/2003 | Lalancette et al. ............ 174/58 |
| 2004/0182857 A1 * | 9/2004 | Feyes et al. ................. 220/3.2 |
| 2005/0051546 A1 * | 3/2005 | Dinh ......................... 220/3.7 |

* cited by examiner

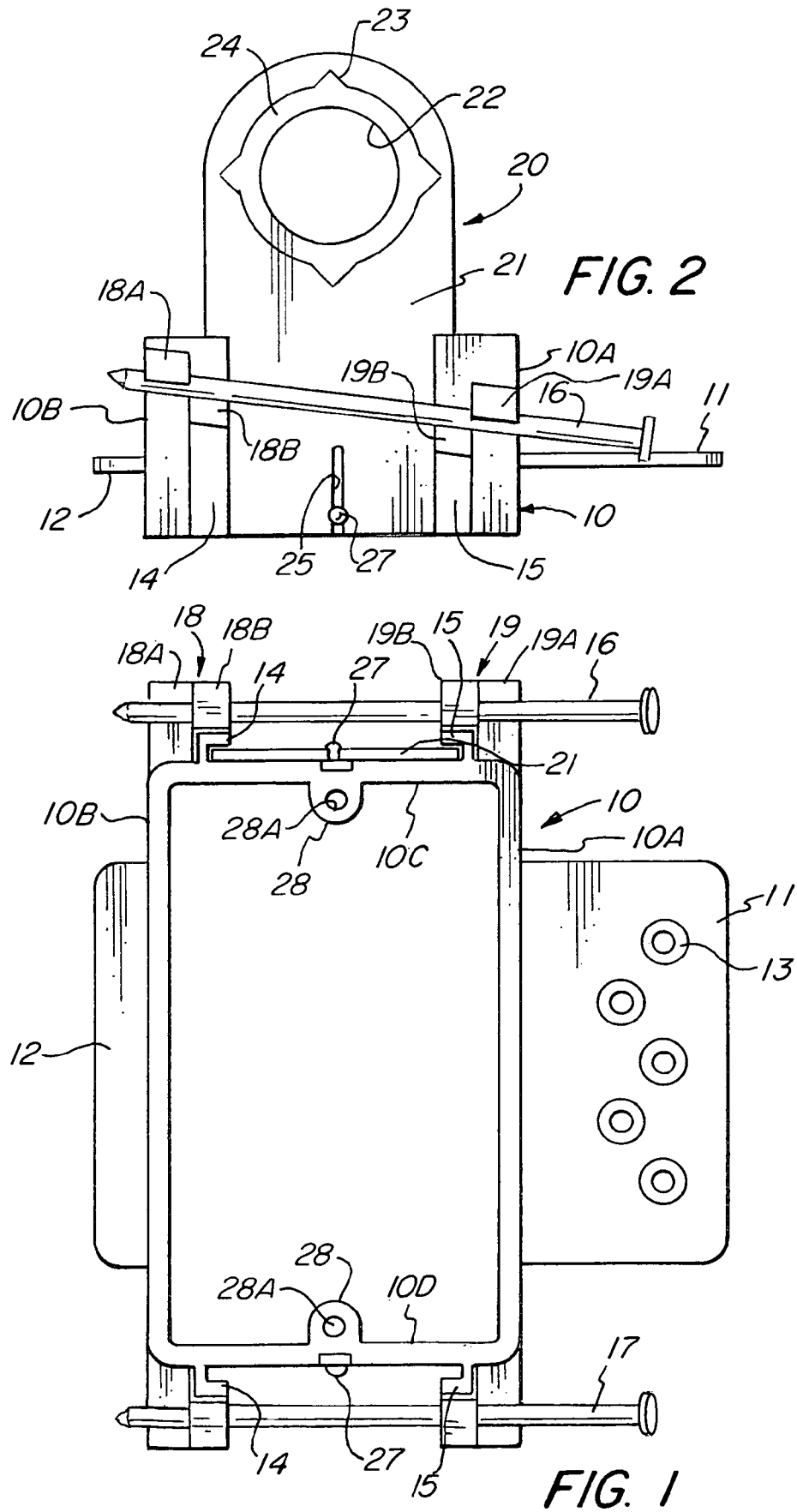

UNIVERSAL LOW VOLTAGE BOX BRACKET

FIELD OF THE INVENTION

This invention relates in general to electric boxes or brackets, and more specifically to a universally mountable, low voltage, box bracket particularly adapted for retaining low voltage electrical wires, e.g. computer or telephone lines in building constructions.

BACKGROUND OF THE INVENTION

In various types of building constructions, the interior walls are generally applied to framing which may consist of generally 2×4 building lumber, or steel studs, or ¾ inch furring strips which are generally fastened to masonry walls, e.g. concrete or cinder block or the like. The known electric boxes currently in vogue are generally constructed for application to specific types of wall structures. For example, an electrical box suitable for attachment to a 2×4 lumber stud could not be satisfactorily applied to a ¾ inch furring strip. Mounting electric boxes to steel studs encounters other problems. In view of the building requirements and the variable types of wall structures involved, the known electrical boxes and/or brackets are not as versatile and/or are limited in the applied use thereof to a particular wall construction.

SUMMARY OF THE INVENTION

An object of this invention is to provide a low voltage box bracket constructed so as to be universally adapted for use in any of the various types of wall construction.

Another object is to provide a low voltage box bracket that can be mounted to a wall structure in a variety of different oriented positions and to varying types of wall construction.

Another object is to provide a low voltage box bracket that is relatively simple in structure, economical to manufacture and positive in operation.

Another object is to provide a universal low voltage box bracket with a readily detachable optional mounting plate for supporting a conduit of variable predetermined sizes.

Another object of this invention is to provide a universal voltage box bracket that is suitable for use for mounting a single electrical outlet, socket and the like, or for gang mounting a plurality of electrical outlets, jacks, sockets or the like.

The foregoing objects, features and other advantages are attained by an electrical box bracket formed as a rectangular open ended box which is sized and shaped so as to be universally mounted to walls of variable constructions and in a variety of different orientations relative thereto. The open ended box bracket includes a pair of opposed side walls interconnected by opposed end walls. The width from front to back of the rectangular shaped box bracket is such that it can be accommodated for attachments to ¾ inch furring strips as well as to 2×4 metal or wooden studs. Connected to each of the opposed side walls is a laterally outwardly extending mounting flange. The laterally extending flanges may also be provided with appropriate fastening openings by which the box bracket may be side mounted to a wall stud or furring strip.

Connected and integrally formed on the exterior surface of the opposed end walls are a pair of spaced apart slide rails or guides for slidably supporting and receiving an optional conduit support plate formed with a variable sized opening for supporting a metal or plastic electrical conduit. Arranged on each of the opposed end walls are a pair of spaced apart fastener holders or brackets that are angularly offset for supporting therebetween a suitable fastener, e.g. a nail or screw, by which the box bracket may be secured to a wall stud or furring strip.

The pipe or conduit support plate may be optionally utilized with the box bracket. The pipe or conduit support plate is arranged to be slidably mounted and supported between the slide rails or guides formed on the respective opposed end walls. The pipe or conduit support includes a metal plate having formed therein a variable hole circumscribed by a frangible portion which may be readily removed, at the option of the user, to enlarge the hole size, if desired. The conduit support at the opposite end is provided with a slot sized to frictionally receive an anchor pin projecting outwardly from the end wall, whereby the pin and slot connection forms a snap fit so that the conduit support is rendered readily, detachably connected, to an end wall of the box bracket.

Preferably, the box bracket may be integrally formed, e.g. by molding, with the optional pipe or conduit support being formed of a suitable metal or plastic.

IN THE DRAWINGS

FIG. 1 is a front elevational view of a universal low voltage box bracket embodying the present invention.

FIG. 2 is a top plan view of FIG. 1.

DETAILED DESCRIPTION

Figure 4:
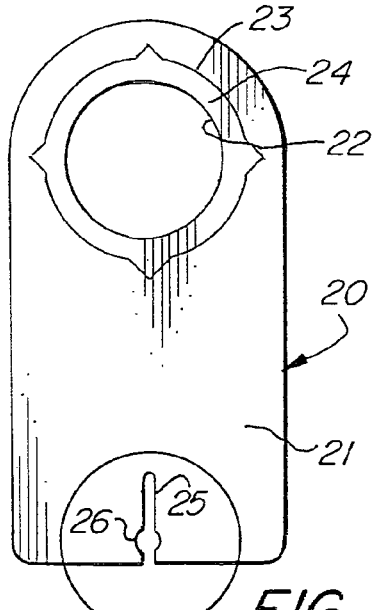
FIG. 4 is a detail plan view of the conduit or pipe support for use with the low voltage box bracket.
Figure 5:
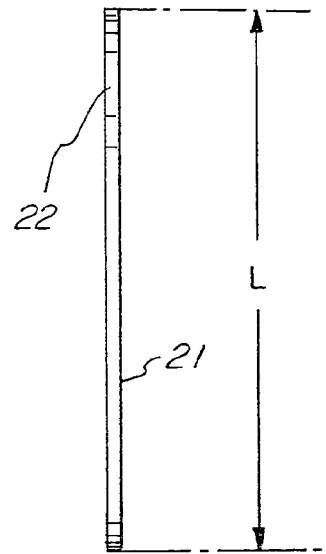
FIG. 5 is an end view of FIG. 4.
Figure 3:
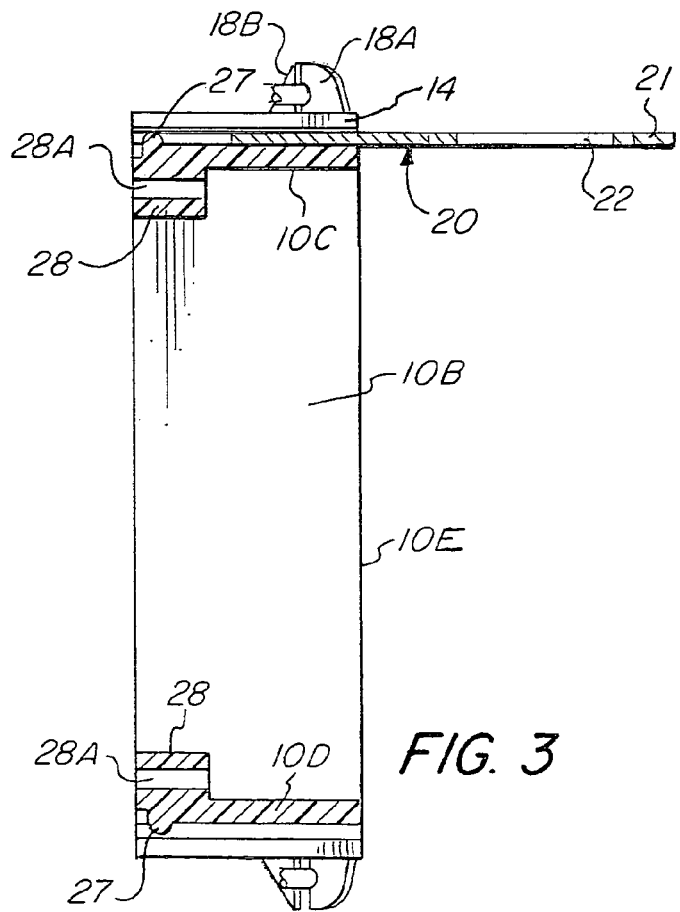
FIG. 3 is a side sectional view of the universal low voltage box bracket of FIG. 1.

Referring to the drawings, FIGS. 1 to 7 illustrate a universal low voltage electric box bracket 10 embodying the present invention. As shown, the electric box bracket 10 includes a pair of opposed side walls 10A, 10B interconnected to opposed end walls 10C, 10D to define a rectangular box having a full open front and back. The width of the rectangular box between the open front and back is approximately 1¼ inches. Connected to each of the respective side walls and projecting laterally outwardly thereof is a side flange 11 and 12. As seen in FIG. 1, the flange 11 has a width which is greater than the opposite flange 12. Also, the flange 11 has a plurality of fastening holes 13 which are adapted to receive suitable fasteners, e.g. nails or screws, for securing the box bracket to a building wood or metal stud or to a furring strip secured to a masonry wall. The respective flanges 11 and 12 are connected intermediately the respective side walls 10A, 10B, so that the distance "D" between the respective flanges 11 and 12 and the back edge 10E of the box is less than the thickness of a furring strip or ¾ inches.

Connected to each of the opposed end walls or top and bottom walls 10C, 10D, as best seen in FIG. 1, are a pair of spaced apart slide rails or guides 14 and 15. The respective slide rails or guides 14, 15 extend transversely the width of the box bracket 10.

Figure 7:
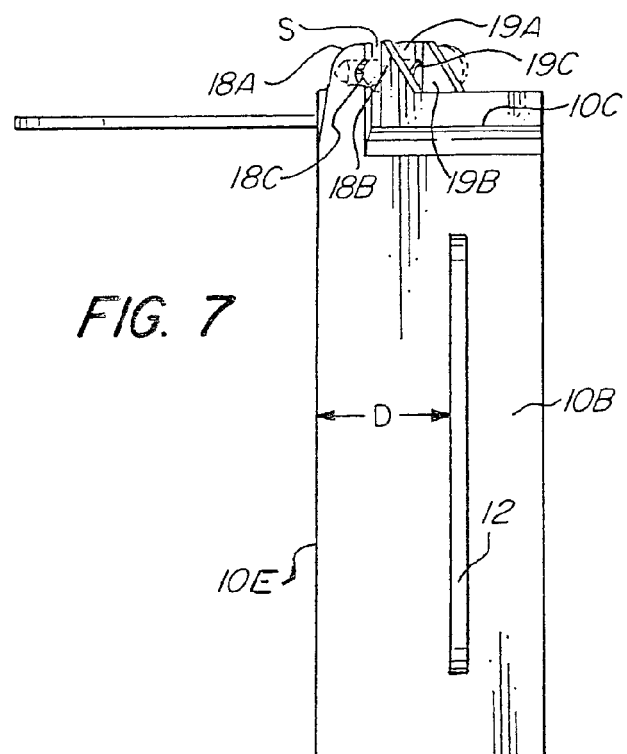
FIG. 7 is a left end view of FIG. 1.

A pair of fastener holders 18, 19 are integrally connected to the respective opposed end walls which are laterally spaced apart in an offset relationship for supporting a fastener therebetween, e.g. a nail 16, 17, or screw and the like. The respective fastener holders 18, 19 include opposed projections 18A, 18B and 19A, 19B that project outwardly from the respective end walls 10C, 10D. As shown, projections 18A, 19A are slightly spaced from its corresponding projection 18B, 19B a distance slightly less than the diameter of the shaft portion of the fastener 16 and 17. The respective fastener projections 18A, 19A intermediate the height thereof are each provided with seat 18C, 19C, as best seen in FIG. 7. With the fastener projections 18, 19 as described, it will be apparent that the shaft portion of the respective fasteners 16 and 17 can be inserted between the respective fastener projections 18A, 18B and 19A, 19B with a force sufficient to push the fastener 16, 17 through the space S defined between projections 18A, 18B and 19A, 19B until the fastener is seated in seats 18C and 19C. The inherent resilience of the material of the box bracket 10 and spacing between projections 18A, 18B and 19A, 19B is such that the fasteners 16, 17 are firmly secured within seats 18C, 19C until such time the fastener is to be driven into an adjacent stud or furring strip by pounding with a hammer or other hammering tool as another means for fastening the box bracket 10 to a building stud or furring strip.

Adjacent the open front of the electric box bracket 10 is a mounting boss 28 with a hole 28A to which a suitable electric device, e.g. a switch, outlet, jack or the like can be secured to the box bracket 10 in the conventional manner. The entire box bracket, as described, may be readily molded of a suitable plastic material as an integral unit.

In accordance with this invention, a pipe or conduit support 20 may be optionally provided for use with the described electric box bracket 10. As shown in FIGS. 2 and 4 to 6, the conduit support 20 is formed preferably as a flat metal plate 21 having a length "L" sufficient to extend into a space defined behind the finished wall surface (not shown). Formed adjacent one end of the metal plate 21 is an aperture or hole 22 to accommodate a pipe or conduit, not shown. Circumscribing the hole 22 is a frangible or breakaway line 23 to facilitate a way of enlarging the hole 22 by the removal of the breakaway portion or ring 24. The frangible line 23 circumscribes the entire hole 22. To enlarge the hole 22 to permit the conduit support plate to accommodate a larger diameter conduit (not shown), the knockout portion or ring 24 is rendered readily removable by the breakaway or frangible line 23.

Figure 6:
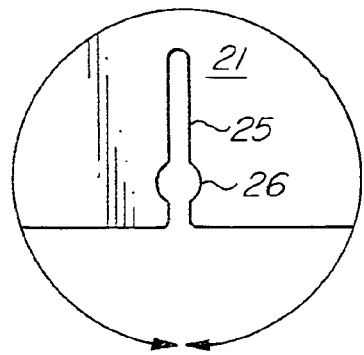
FIG. 6 is an enlarged detail as noted by arrows 6 in FIG. 5.

Formed at the other end of the conduit support means 20 is a slot 25. As best seen in FIG. 6, the slot 25 also includes an enlarged hole or space 26 arranged to engage the anchor pin or boss 27 formed on each of the opposed end walls 10C, 10D. It will be apparent that the attachment of the conduit plate 20 is attained by sliding the conduit plate between the opposed guides or slide rails 16 and 17 so that the slot 25 receives the pin or boss 27, which is seated in the hole or enlarged opening 26 with a snap fit due to the inherent resilience of the cooperating pin 27 and slot 26 connection. The arrangement is such that the conduit plate 20 can be supported and locked in place on either end wall 10C or 10D.

Figure 8:
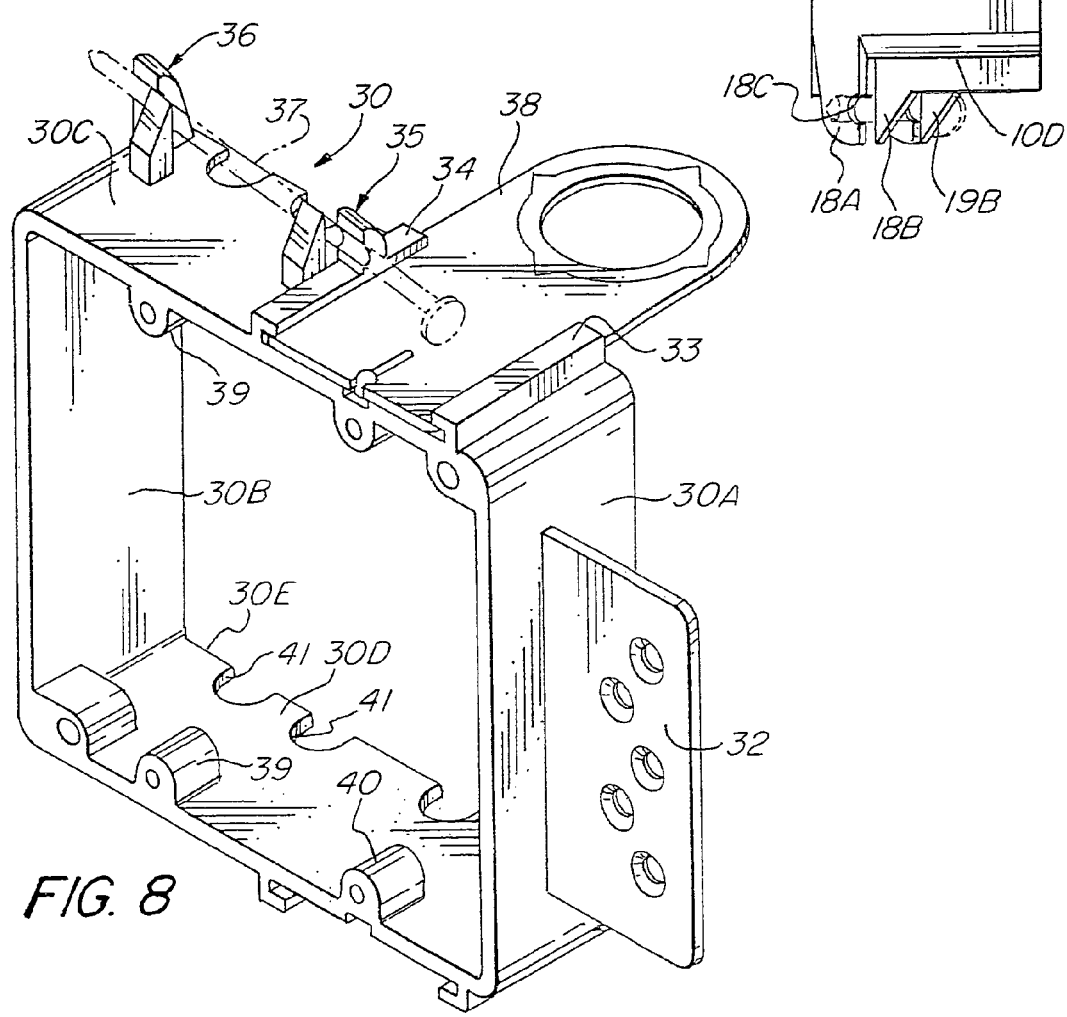
FIG. 8 is a perspective view of a modified form of the invention.
Figure 10:
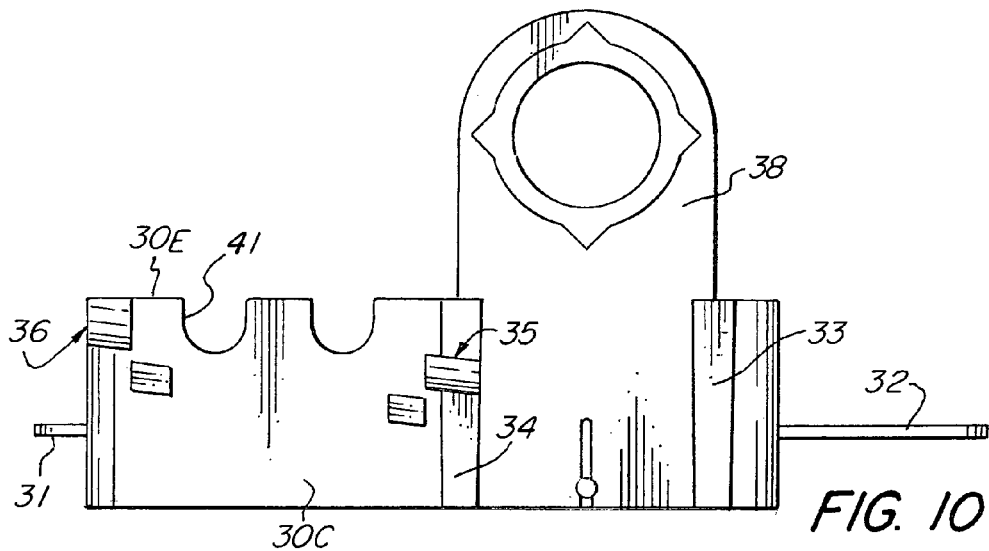
FIG. 10 is a top plan view of FIG. 9.
Figure 9:
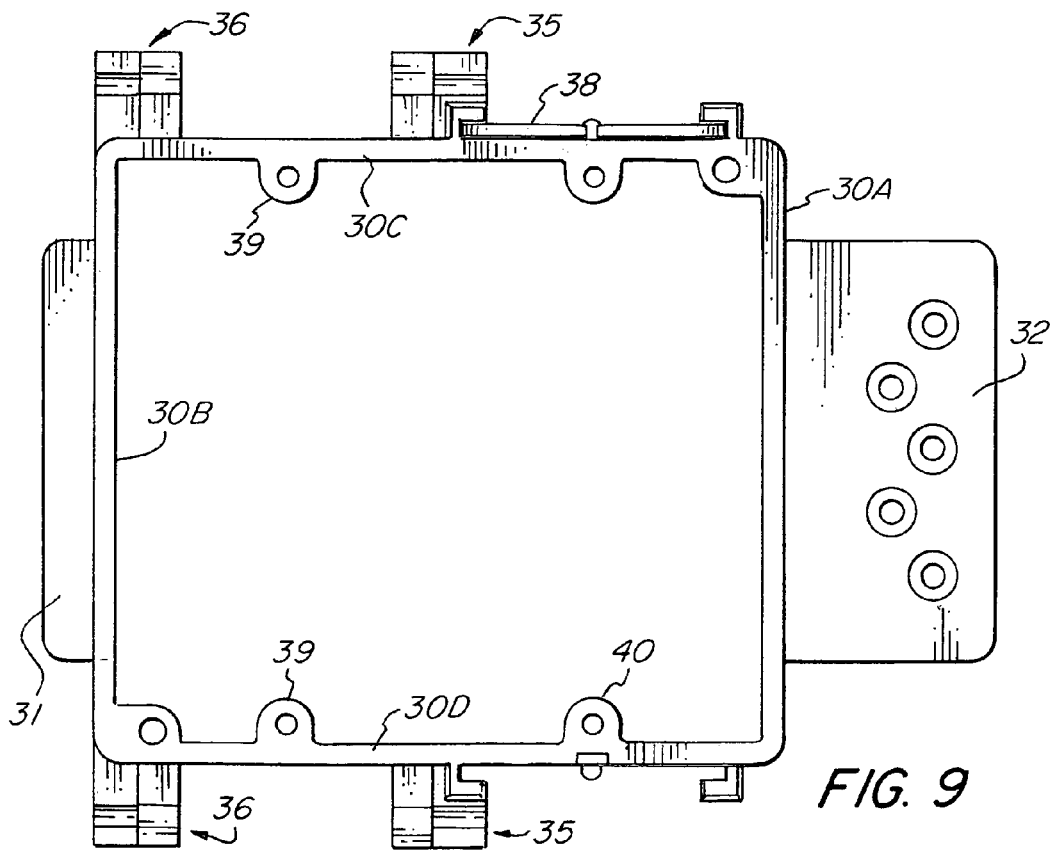
FIG. 9 is a front end view of FIG. 8.

FIGS. 8 to 10 illustrate a modified form of the invention. As shown in FIGS. 8 to 10, the instant invention is embodied in a suitable gang type bracket box arranged to accommodate two or more electrical devices such as outlets, plugs, jacks, switches and the like. As shown in FIG. 8, the box bracket 30 includes opposed side walls 30A, 30B and interconnecting end walls 30C, 30D similar to that hereinbefore described, except that the end walls 30C, 30D have transverse width sized to accommodate two or more electric devices (not shown). The box bracket 30 includes a fully opened front and back. Laterally extending from the respective side walls 30A, 30B are lateral flanges 31 and 32, similar to flanges 12 and 13 hereinbefore described. The illustrated box bracket 30 is sized to receive two electric devices (not shown).

The illustrated bracket 30 is also provided with a pair of transverse slide rails or guides 33, 34 located adjacent side wall 30A on each of the opposed end walls 30C and 30D. Also formed on each of the opposed end walls 30C, 30D are a pair of spaced apart fastener holders for supporting therein a nail or screw type fastener 37, similar in structure to that hereinbefore described with respect to FIGS. 1 to 7. In function and structure, the fastener holders 35 and 36 are similar to the fastener holders 18 and 19 hereinbefore described.

The embodiment of FIGS. 8 to 10 may also be optionally used with a detachable support plate 38 which is similar in structure to the support plate 20 hereinbefore described. The respective end walls 30C and 30D include opposed mounting bosses 39, 39 and 40, 40 to which an electric device, such as a jack, socket, switch or the like may be secured.

In the embodiment of FIGS. 8 to 10, the rear or back edges 30E of the respective end walls 30C, 30D may be provided with notches or cut out portion 41 to accommodate any conduits and/or to provide access for guiding any electrical conductor in the interior of the box bracket 30. In all other respects, the structure and function of the embodiment of FIGS. 8 to 10 is similar to that hereinbefore described with respect to the embodiment disclosed and described with respect to FIGS. 1 to 7.

From the foregoing description, it will be apparent that the respective box brackets 10 and 30 are rendered universally adapted for use with variable types of wall constructions. Further, each of the respective embodiments can be variously orientated as that can be mounted in various positions relative to a given wall structure. The respective box brackets 10 and 30 are constructed so that they can be mounted either to the left or right of a given stud or furring strip. Also, the bracket boxes 10 and 30 are provided with alternate means by which the box bracket may be attached to a stud or furring strip. As described, the box bracket 10 and 30 may be attached to a support wall by means of the side flanges or by the fasteners 16 or 37 as herein described. The respective box brackets 10 and 30 are universally adapted to be used in any oriented position to any type of wall structure. The use of the support plate is also optional and mounted on the box bracket so as to be readily detachable. The overall box bracket described is relatively simple in structure, and can be readily molded as a unitary integral structure having an optionally detachable support plate for holding or supporting an electric conduit.

While the present invention has been described with respect to the illustrated embodiment, it will be understood that various modifications may be made without departing from the spirit or scope of the invention.

The invention claimed is:

1. A universal low voltage electric box bracket adapted for use on various wall constructions:

a pair of opposed side walls and a pair of opposed end walls interconnected to said opposed side walls to define a rectangular box bracket having an opened front and back, two opposed parallel spaced apart slide rails connected on at least one of said end walls and extending substantially perpendicular to a back edge of the at least one of said end walls, a conduit support to be detachably and slidably disposed between said two opposed parallel spaced apart slide rails, said conduit support having one end projecting laterally beyond said opened back of said box bracket when positioned between said two opposed parallel spaced apart slide rails, said projecting one end of said conduit support having a predetermined sized opening formed therein, and means for detachably securing said conduit support on said one of said end walls.

2. A universal low voltage electric box bracket as defined in claim 1, where said means for securing said conduit support to said one end wall comprises:

an anchor pin projecting above the plane of said one end wall, and a complementary slot formed in said conduit support, said complementary slot having an enlarged opening intermediate the length of said slot forming a seat for receiving said anchor pin to detachably retain said conduit support on said one end wall.

3. A universal low voltage electric box bracket as defined in claim 1 wherein said conduit support includes a frangible break away portion circumscribing said predetermined sized opening whereby said frangible break away portion is rendered readily removable to form an enlarged predetermined sized opening.

4. A universal low voltage electric box bracket as defined in claim 3 and including a pair of spaced apart and angularly offset fastener holder means projecting outwardly beyond the plane of at least one of said end walls for supporting a fastener therebetween, each fastener holder means including a pair of spaced apart outwardly extending projections wherein the space defined between said pair of projections is slightly less than the diameter of a fastener to be received therebetween, and one of said projections having a notch formed therein to define a seat for frictionally supporting a fastener between said extending projection.

5. A universal low voltage electric box bracket as defined in claim 1 and including a pair of spaced apart and angularly offset fastener holders project outwardly beyond the plane of each of said end walls, each fastener holder means including a pair of spaced apart outwardly extending projections wherein the space defined between said pair of projections is slightly less than the diameter of a fastener to be received therebetween, and one of said projections having a notch formed therein to define a seat for frictionally supporting a fastener between said extending projection.

6. A universal low voltage electric box bracket as defined in claim 5 and including:

a lateral flange connected to each of said side walls intermediately thereof and extending outwardly of said connected side wall for providing an alternate side mounting means for said box bracket.

7. A universal low voltage electric box as defined in claim 1 wherein said opposed end walls have a length sufficient to accommodate more than one electrical device between said side walls.

8. A universal low voltage electric box bracket for use on various wall constructions:

a pair of opposed side walls, a pair of opposed end walls interconnected with said opposed side walls to define a rectangular box frame having an open front and back, two opposed parallel spaced apart slide rails forming a slideway on each of said opposed end walls, said two opposed parallel spaced apart slide rails extending substantially perpendicular to a back edge of its respective end wall, a conduit support in the form of a plate slidably disposed between said two opposed parallel spaced apart slide rails, said conduit support having a predetermined size hole formed therein, a break away portion circumscribing said hole which is rendered readily removable to form an enlarged predetermined size opening, securing means for detachably connecting said conduit support to its respective end wall, a pair of transversely and laterally offset fastener holders mounted on each of said end walls, each of said fastener holders include a pair of spaced apart projections extending beyond the outer surface of the corresponding end wall, said spaced fastener support projection defining therebetween a space slightly less than the diameter of a fastener adapted to be received therebetween, one of said support projections of each such pair having a notch to define a seat for a fastener supported therebetween, a laterally outwardly extending flange connected to each of said side walls, and opposed mounting bosses connected to the undersurface of said end walls adjacent the front of said box bracket, to which an electric device may be secured.

9. A universal low voltage box bracket as defined in claim 8 wherein said securing means includes:

an anchor pin projecting beyond the outer surface of each of said end walls, a complementary slot formed in the end of said conduit support opposite said hole, said slot having a width slightly less than the diameter of said anchor pin to provide a friction fit, and said slot including an enlarged opening intermediate the length of said slot to provide a seat for said anchor pin in the assembled position to secure said conduit support to its corresponding end wall.

10. A universal low voltage electric box bracket as defined in claim 8 wherein said end walls have a length sufficient to accommodate more than one electric device within said box bracket.

11. A universal low voltage box bracket comprising:

a pair of opposed side walls, a pair of opposed end walls interconnected between said side walls to define a rectangular bracket having an open front and back, a pair of spaced apart slide rails extending transversely and substantially perpendicular to a back edge of said end walls to define a slideway on each of said end walls, a conduit support arranged to be slidably disposed between said pair of spaced apart slide rails, said conduit support having a predetermined sized opening adjacent one end thereof, means whereby said opening may be readily enlarged at the option of the user, means, placed between said pair of spaced apart slide rails, for detachably securing said conduit support to its associated end wall, and a fastener holding means projecting outwardly of the respective end walls, said fastener holding means including a pair of transversely, spaced apart and angularly offset fastener retainer relative to its respective end wall, said fastener retainer including a pair of spaced apart outwardly extending projections wherein the space defined between each pair of said projections is slightly less than the diameter of the fastener supported therebetween, said projections defining therebetween spaced fingers with a space having a width slightly less than the diameter of a fastener adapted to be received therein, said projections being disposed immediately adjacent to each of said pair of spaced apart slide rails, and one of said projections being formed with a notch to define a seat for retaining a fastener therein.

\* \* \* \* \*